(12) United States Patent
Catron et al.

(10) Patent No.: US 7,178,855 B2
(45) Date of Patent: Feb. 20, 2007

(54) INTEGRAL DOGHOUSE FASTENER WITH RETAINING FEATURE

(75) Inventors: Roger Catron, Washington, MI (US); Aaron DeLong, Oxford, MI (US); Gerry Krause, Utica, MI (US); Marko Markovic, Parma, OH (US)

(73) Assignee: Lear Corporation, Southfield, MI (US)

( * ) Notice: Subject to any disclaimer, the term of this patent is extended or adjusted under 35 U.S.C. 154(b) by 43 days.

(21) Appl. No.: 10/906,740

(22) Filed: Mar. 3, 2005

(65) Prior Publication Data
US 2006/0197356 A1 Sep. 7, 2006

(51) Int. Cl.
*B60J 5/00* (2006.01)

(52) U.S. Cl. ............... 296/146.7; 52/511; 24/297; 24/458

(58) Field of Classification Search ............ 296/146.7; 52/511; 24/458, 297
See application file for complete search history.

(56) References Cited

U.S. PATENT DOCUMENTS

| 4,861,208 A * | 8/1989 | Boundy ............... 411/339 |
| 5,507,610 A * | 4/1996 | Benedetti et al. ............ 411/339 |
| 6,196,607 B1 * | 3/2001 | Gulisano ................. 296/39.1 |
| 6,484,370 B2 * | 11/2002 | Kanie et al. .................. 24/297 |
| 6,594,870 B1 * | 7/2003 | Lambrecht et al. ............ 24/297 |
| 6,983,978 B2 * | 1/2006 | Radu et al. ............... 296/146.7 |
| 2006/0017306 A1 * | 1/2006 | Smith et al. ............ 296/146.7 |

* cited by examiner

*Primary Examiner*—Dennis H. Pedder
(74) *Attorney, Agent, or Firm*—Earl LaFontaine, Esq.; Artz & Artz, P.C.

(57) ABSTRACT

An automotive door panel fastener assembly is provided including a substrate and a doghouse structure molded thereon. The doghouse structure includes a doghouse floor, a doghouse ceiling, a first doghouse sidewall having a first forward end and a first rearward end, a second doghouse sidewall having a second forward end and a second rearward end, a doghouse endwall, and a doghouse insertion opening. A pin chamber is formed through the doghouse ceiling. An entrance slot is formed in the doghouse ceiling to provide a path from the doghouse insertion opening to the pin chamber. The entrance slot has a first slot side and a second slot side. A first flexible arm has a first fixed end and a first free end. The first flexible arm is flexible in response to an inward force and is rigid in response to an outward force.

17 Claims, 4 Drawing Sheets

INTEGRAL DOGHOUSE FASTENER WITH RETAINING FEATURE

TECHNICAL FIELD

The present invention relates generally to fastener assembly including an integral doghouse and more particularly to a fastener assembly comprised of an integral doghouse and insertable pin assembly held in place by a retaining feature.

BACKGROUND OF THE INVENTION

Automotive manufacturing is often a complex process involving numerous assembly steps involving detailed parts and using both machinery and human assemblers. As such, assembly techniques are preferably simple and robust to reduce the stresses and tolerances on human assemblers, machines, and even designers. Regions of the automobile, such as the door panels are particularly part intensive. Therefore, these regions would benefit greatly from improved assembly design and techniques. A staple of assembly is the design of fastener assemblies.

A common technique for assembly involves the use of pin assemblies that may be inserted into ports on the stamped door panel to quickly and efficiently attach various parts thereto. It is common for such pin assemblies to be mounted to a substrate prior to insertion into the stamped door panel. Molding the pin assemblies directly onto the substrate results in an inflexible design that is difficult to adjust to changes in tolerance. Instead, the pin assemblies are mounted to molded structures on the substrate prior to assembly. The difficulty with existing mounting techniques involves their use of interference fit to secure the pin assemblies to the substrate. Present technique is to secure the pin assemblies through the use of frictional press-fit slots utilizing bumps or ramps. Bumps and ramps utilized tend to interfere with machining gages, which can incur undesirable manufacturing costs. In addition, interference fit assemblies may provide difficulties in confidently guaranteeing the pin assemblies are properly secured.

Automotive components require fastening techniques, which are simple to manufacture and assemble. The fastening technique should above all be reliable and efficient. It would therefore be highly desirable to have an automotive fastener assembly with improved assembly characteristics. It would further be highly desirable to have an automotive fastener assembly that provided reliable and secure fastening.

SUMMARY OF THE INVENTION

It is therefore an object to the present invention to provide an fastener assembly with improved assembly characteristics. It would further be highly desirable to have a fastener assembly without gage interference.

In accordance with the objects of the present invention an automotive door panel fastener assembly is provided including a substrate and a doghouse structure molded thereon. The doghouse structure includes a doghouse floor, a doghouse ceiling, a first doghouse sidewall having a first forward end and a first rearward end, a second doghouse sidewall having a second forward end and a second rearward end, a doghouse endwall, and a doghouse insertion opening. A pin chamber is formed through the doghouse ceiling. An entrance slot is formed in the doghouse ceiling to provide a path from the doghouse insertion opening to the pin chamber. The entrance slot has a first slot side and a second slot side. A first flexible arm has a first fixed end and a first free end. The first flexible arm is flexible in response to an inward force and is rigid in response to an outward force.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
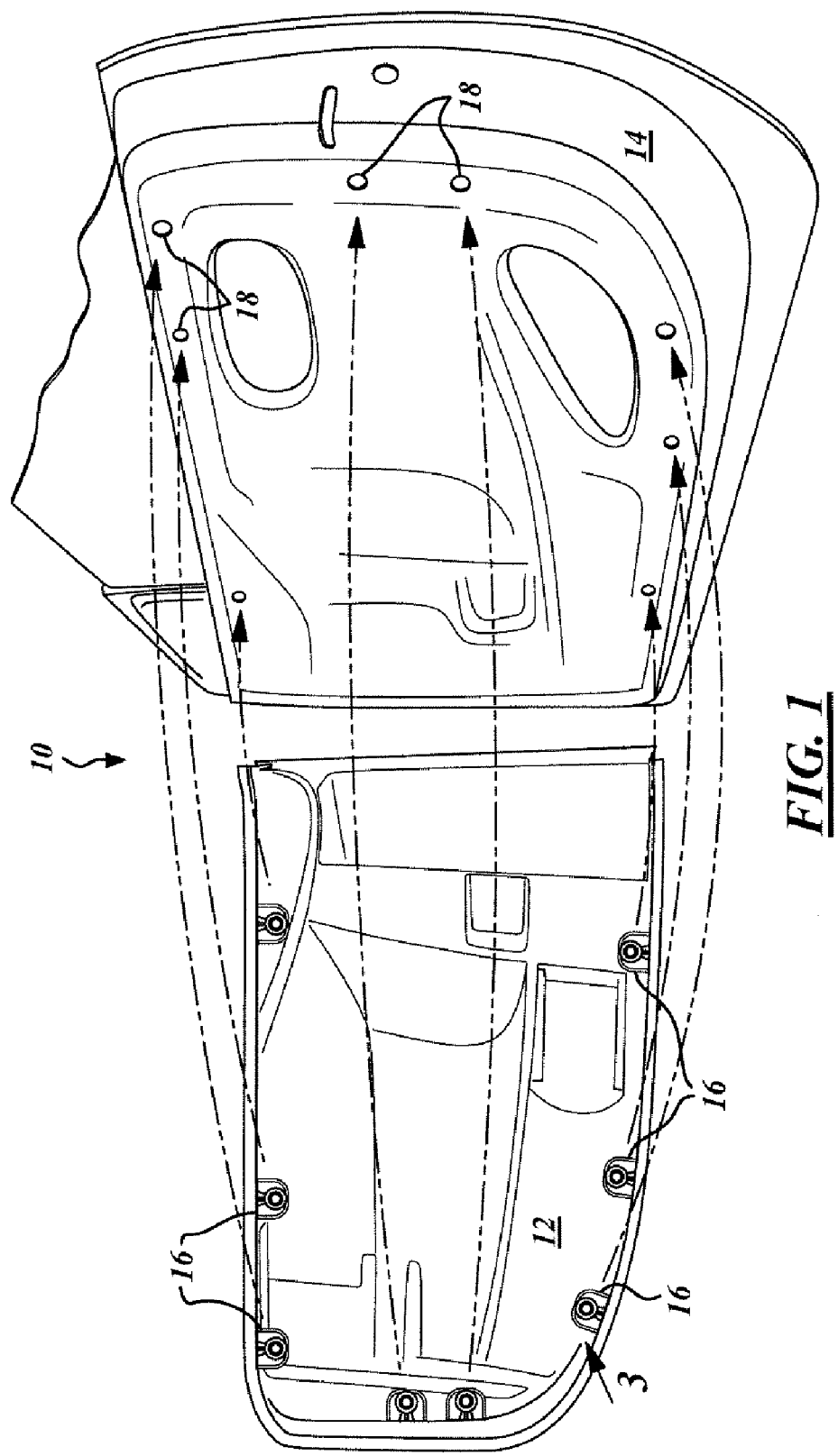
FIG. 1 is an illustration of an automotive door panel assembly in accordance with the present invention, the automotive door panel assembly illustrated in an exploded view.
Figure 2:
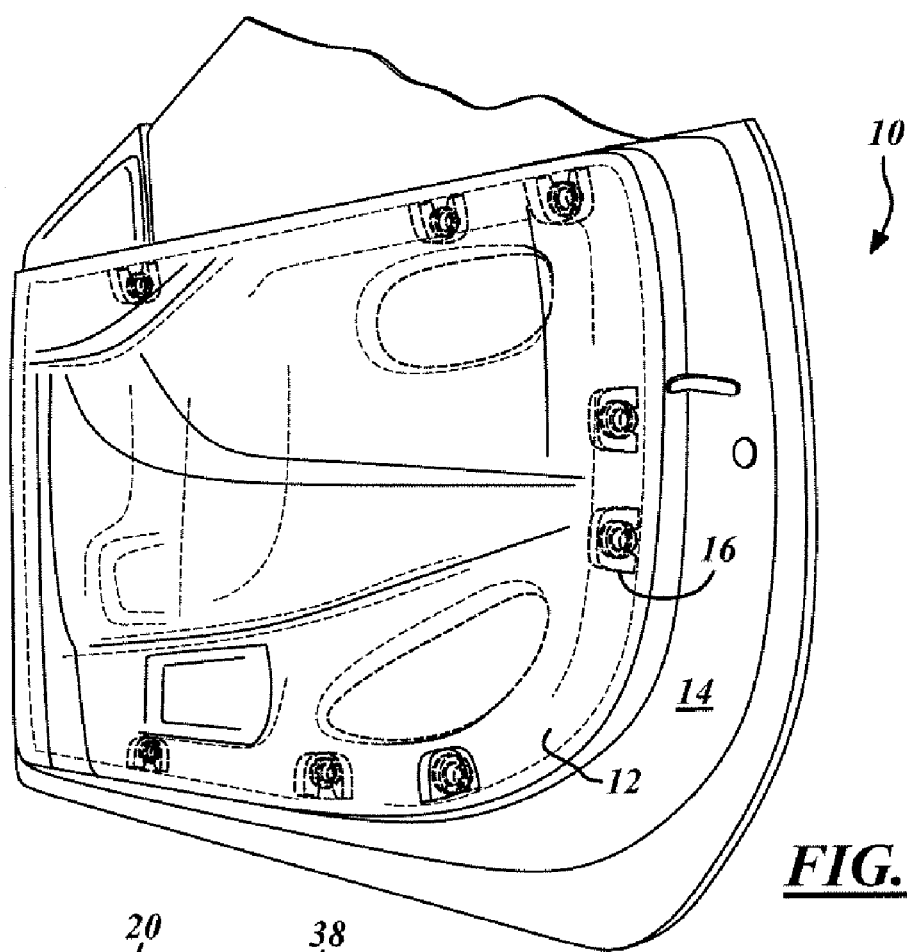
FIG. 2 is an illustration of the automotive door panel assembly illustrated in FIG. 1.

Referring now to FIG. 1, which is an illustration of an automotive door panel assembly 10 in accordance with the present invention. Although the present invention may be described in direct relation to the door panel assembly 10, it should be understood that its principles, concepts, and novelty may be appropriated to a variety of fastener applications as would occur to one skilled in the art in light of this disclosure. The door panel assembly 10 is comprised of an inner door substrate 12 commonly produced using molding techniques. It is desirable to have a quick, efficient, and reliable method for attaching this inner door substrate 12 to a stamped door panel 14 during vehicle assembly (see FIG. 2).

Figure 3:
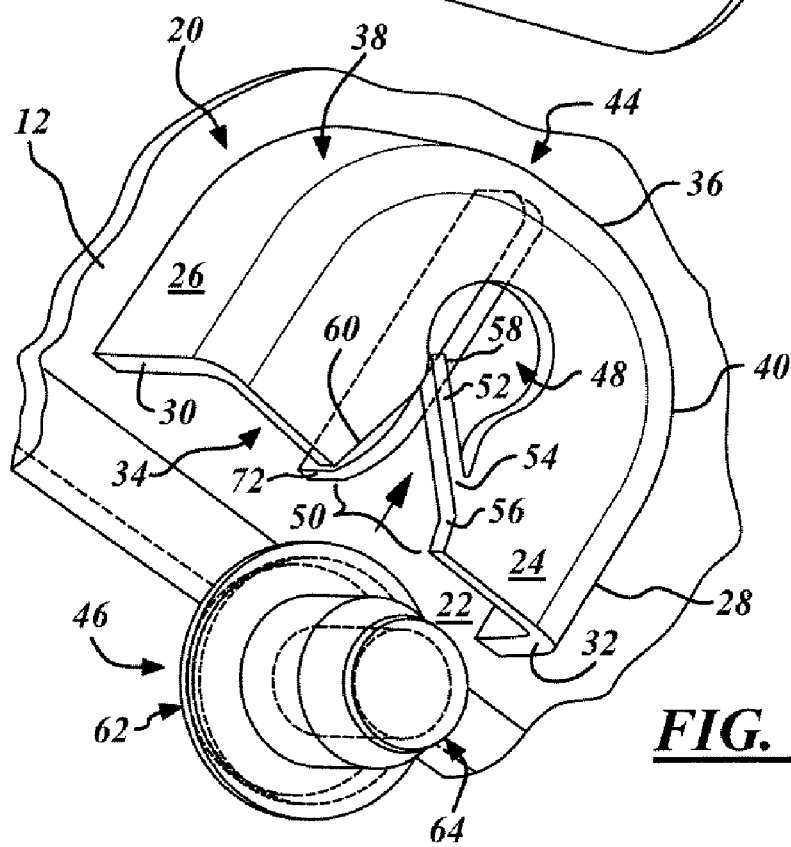
FIG. 3 is a detail illustration of an automotive door panel fastener assembly for use in the door panel assembly illustrated in FIG. 1, the illustration showing the pin element assembly prior to installation.

The present invention addressed this need by providing a unique design for a plurality of doghouse style fasteners 16 to be produced on the inner door substrate 12 and configured to each engage one of a plurality of mounting ports 18 formed on the stamped door panel 14. Each of these doghouse style fasteners 16 is comprised of a doghouse structure 20 as illustrated in FIG. 3. The doghouse structure 20 is contemplated to be modified in size and shape to suit individual applications. The doghouse structure 20 is comprised of doghouse floor 22, preferably formed by the substrate 12. Positioned remotely from the doghouse floor 22 and preferably parallel is a doghouse ceiling 24. The ceiling 24 is supported above the floor by way of a first doghouse sidewall 26 and a second doghouse sidewall 28 positioned between the floor 22 and ceiling 24 such that a structure resembling a doghouse is achieved. At the first forward end 30 of the first doghouse sidewall 26 and the second forward end 32 of the second doghouse sidewall 28 is formed a doghouse insertion opening 34. It is contemplated that the doghouse structure 20 is to be molded during molding of the substrate 12.

The doghouse structure 20 may also include a doghouse endwall 36 formed to bridge the gap between the first rearward end 38 of the first doghouse sidewall 26 and the second rearward end 40 of the second doghouse sidewall 28. The rearward ends 38, 40 are intended only to be general locations. In reality the first doghouse sidewall 26, the second doghouse sidewall 28, and the doghouse endwall 36 may form a continuous wall assembly including an arched wall portion 44. The doghouse structure 20 acts as a receptacle for a pin element assembly 46. As such, the doghouse structure 20 further includes a pin chamber 48 formed within, and preferably centered therein, the doghouse ceiling 24. An entrance slot 50 is formed in the doghouse ceiling 24 to provide a clear pathway from the doghouse insertion opening 34 through the doghouse ceiling 24 to the pin chamber 48.

Figure 4:
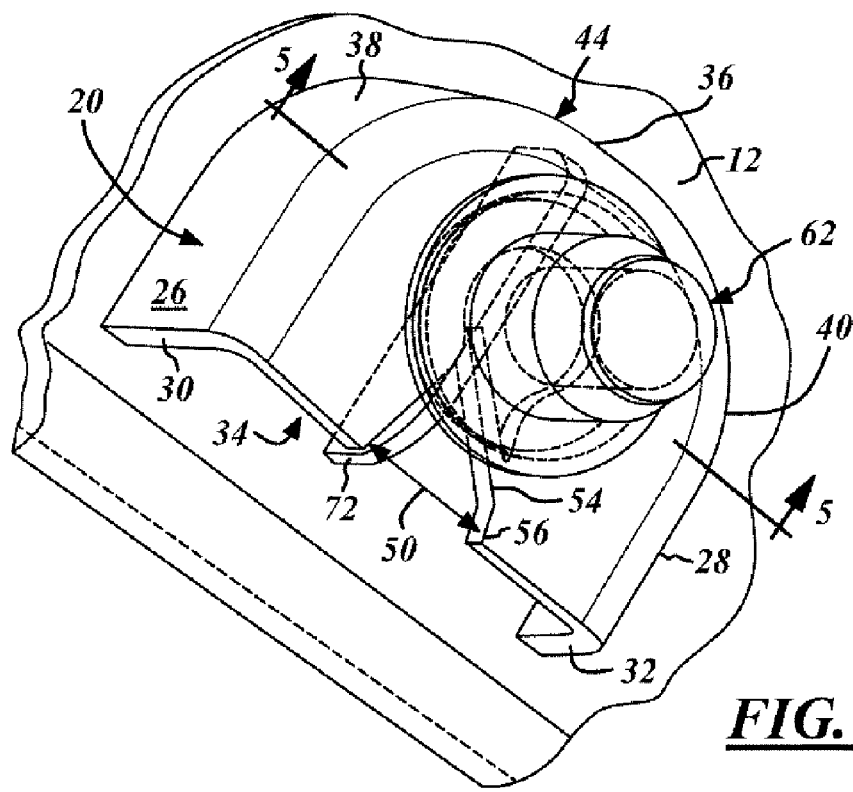
FIG. 4 is a detail illustration of an automotive door panel fastener assembly for use in the door panel assembly illustrated in FIG. 1, the illustration showing the pin element assembly after installation.

It is desirable to insert the pin element assembly 46 into the pin chamber 48 and retain it therein. To do so, the present invention includes a first flexible arm protrusion 52 molded as a portion of the doghouse structure 20. The first flexible arm protrusion 52 includes a first fixed end 54 fixed to the first slot side 56 of the entrance slot 50. The first flexible arm protrusion 52 further includes a first free end 58 protruding outward towards a second slot side 60 of the entrance slot 50. The first flexible arm protrusion 52 is preferably angled inwardly toward the pin chamber 48 such that an inward force will flex the arm protrusion 52 inward and allow the pin element assembly 46 to pass past and into the pin chamber 48 (see FIG. 4). However, the arm protrusion 52 will be relatively rigid towards outward forces and as such will lock the pin element assembly 46 into place within the pin chamber 48 once it has passed into the pin chamber 48.

Although the pin element assembly 46 may be formed in a variety of fashions to pass through the entrance slot 50 and be secured within the pin chamber 48, it is contemplated that the pin element assembly 46 include a footing portion 62 and a pin extension 64 extending upwards therefrom. The footing portion 64 may further include a lower grommet footing 66 and an upper grommet footing 68. The pin extension 64 is formed on the lower grommet footing 66 and passes through the upper grommet footing 68 such that a pin lower portion 70 is positioned between the grommet footings 66,68. The pin lower portion 70 is inserted through the entrance slot 50 and into the pin chamber 48 such that the lower grommet footing 66 passes underneath the doghouse ceiling 24 and the upper grommet footing 68 passes over the doghouse ceiling 24. In this fashion the pin element assembly 46 is secured within the doghouse structure 20. A fin element 72 molded onto and extending upwards from the doghouse floor 22 may be utilized to press the lower grommet footing 66 into the doghouse ceiling 24 to further prevent movement of the pin element assembly 46 once installed. The fin element 72 is preferably centered on the entrance slot 50 to assist in guiding the pin element assembly 46 in while requiring only minimal structure.

Figure 5:
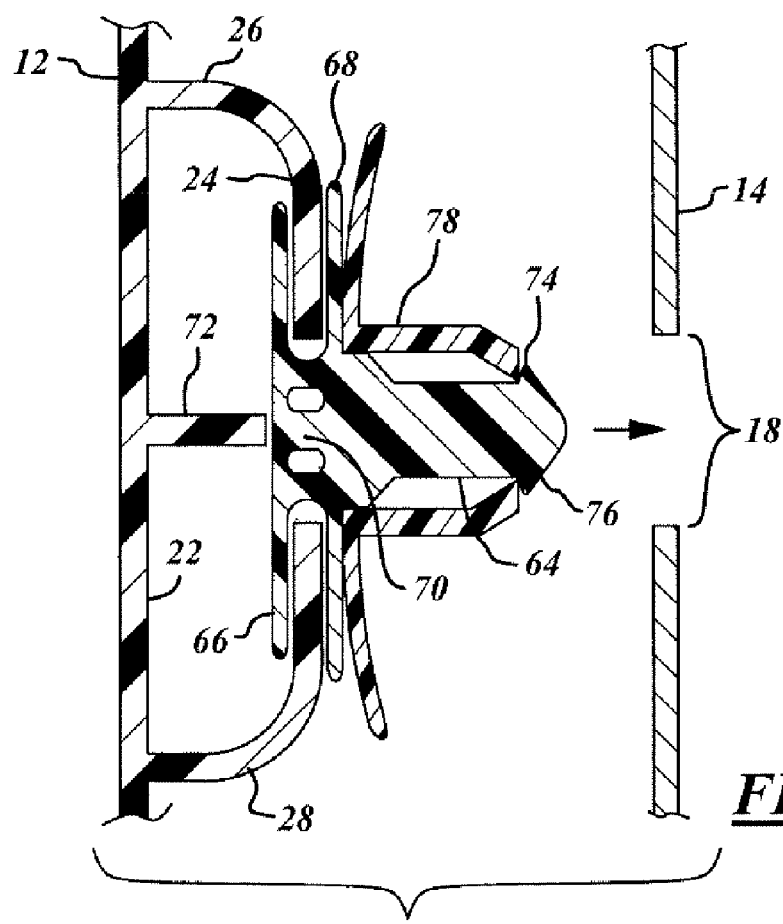
FIG. 5 is a cross-sectional illustration of the automotive door panel fastener assembly illustrated in FIG. 1, the fastener assembly posed for installation into the stamped door panel.

As illustrated in FIG. 5, the pin extension 64 extends well above the doghouse structure 20 once inserted such that it can be utilized to secure the substrate 12 to other structures such as the stamped door panel 14. One method of such attachment contemplates the use of a locking tabular head 74 formed on an upper pin surface 76. The locking tabular head 74 may alone be used as a securing method through insertion through one of the mounting ports 18. Alternately, a sealing gasket 78 may be first positioned on the pin extension 64 such that as it is inserted into the mounting ports 18, a seal is generated between the substrate 12 and the stamped door panel 14 or other structure.

Figure 6:
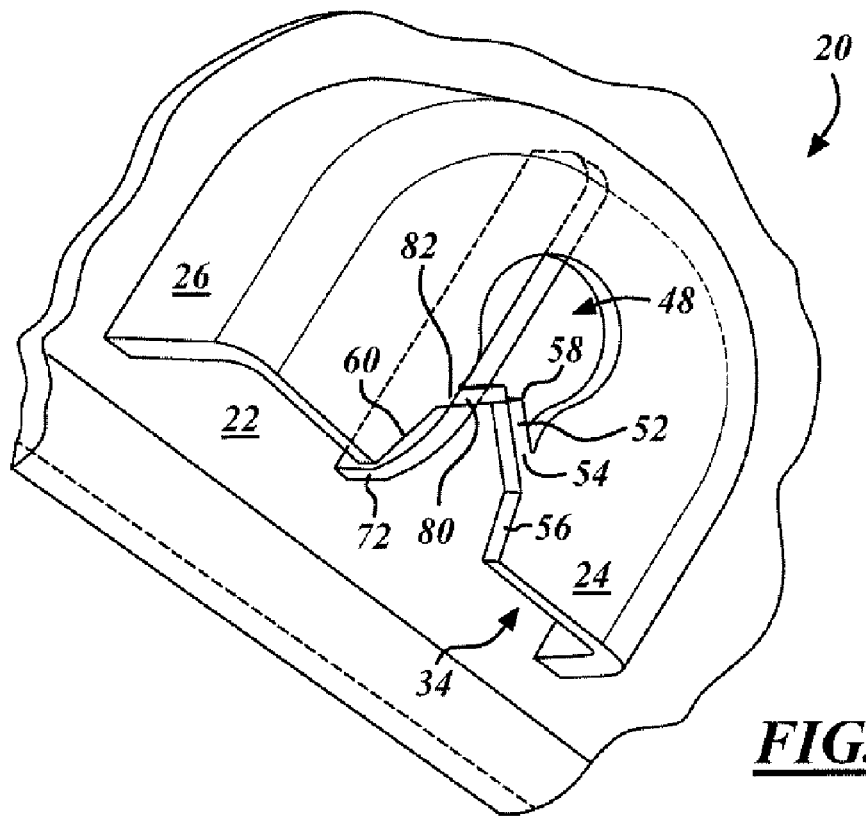
FIG. 6 is an illustration of an alternate embodiment of the automotive door panel fastener assembly illustrated in FIG. 3.

Thus far the invention has been described as a single embodiment utilizing a single flexible arm protrusion 52 to lock the pin element assembly 46 into the pin chamber 48. As illustrated in FIG. 6, the invention may further utilize a second flexible arm protrusion 80 used in conjunction with the first flexible arm protrusion 52. This second flexible arm protrusion 80 has a second fixed end 82 fixed to the second slot side 60 and a second free end 84 extending outwards towards the fist slot side 56. The free ends 58, 84 generally meet in the center and both flexible arms 52, 80 are angled inwardly towards the pin chamber 48. This functions similar to use of a single flexible arm, but the free ends 58, 84 provide a point of support centered on the entrance slot 50 and thereby act to minimize shifting of the pin element assembly 46 back towards the entrance slot 50 once it has been moved into the pin chamber 48.

Figure 7:
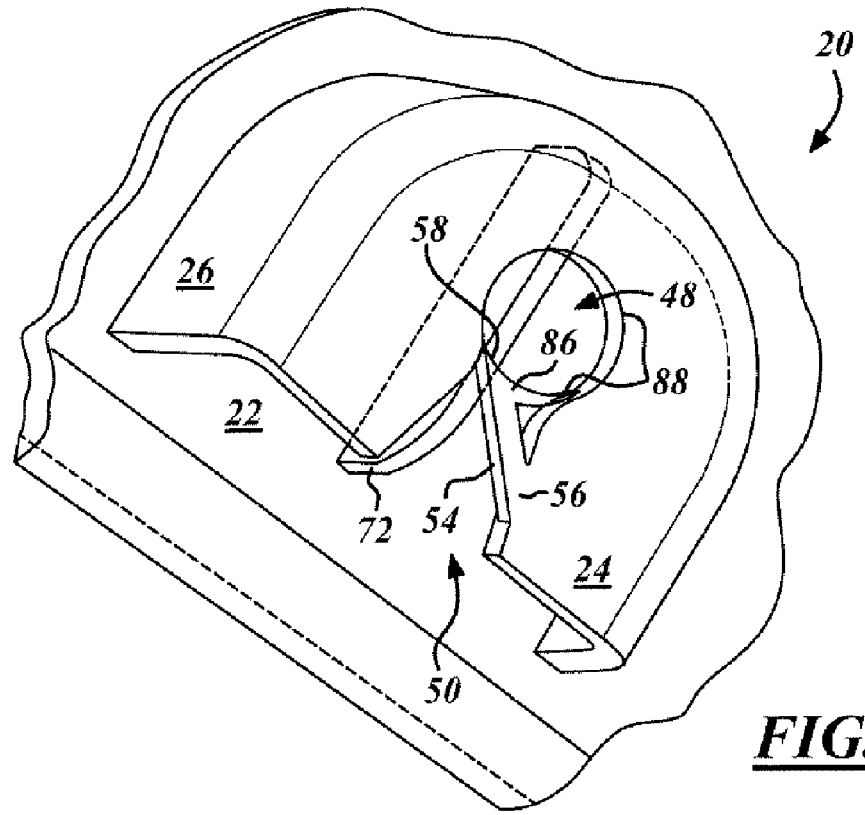
FIG. 7 is an illustration of an alternate embodiment of the automotive door panel fastener assembly illustrated in FIG. 3.

A similar restraint on movement may be achieved using only a single flexible arm as shown in the embodiment illustrated in FIG. 7. In such an embodiment, the first flexible arm protrusion 52 includes a perimeter arm extension 86 formed on the first free end 58 and extending backwards so as to form a generally continuous pin chamber perimeter 88. This provides continuous support around the pin lower portion 70 and prevents movement. The perimeter arm extension 86 is preferably designed to slide along the pin chamber inner wall 90 as the first flexible arm protrusion 52 is flexed. One embodiment providing this functionality is the generally check mark shaped flexible arm protrusion 52 and perimeter arm extension 86 illustrated in FIG. 7.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An automotive door panel fastener assembly comprising:
    a substrate;
    a doghouse structure molded onto said substrate, said doghouse structure comprising:
    a doghouse floor formed by said substrate;
    a doghouse ceiling positioned above and separated from said doghouse floor;
    a first doghouse sidewall joining said doghouse ceiling to said doghouse floor, said first doghouse sidewall having a first forward end and a first rearward end;
    a second doghouse sidewall joining said doghouse ceiling to said doghouse floor, said second doghouse sidewall having a second forward end and a second rearward end;
    a doghouse endwall joining said first rearward end to said second rearward end; and
    a doghouse insertion opening bounded by said doghouse ceiling, said doghouse floor, said first doghouse sidewall and said second doghouse sidewall;
    a pin chamber formed through said doghouse ceiling;
    an entrance slot formed in said doghouse ceiling, said entrance slot providing a path from said doghouse insertion opening to said pin chamber, said entrance slot having a first slot side and a second slot side;

a first flexible arm having a first fixed end molded to said first slot side and a first free end extending towards said second slot side, said first flexible arm flexible in response to an inward force towards said pin chamber, said first flexible arm rigid in response to an outward force away from said pin chamber; and a perimeter arm extension formed on said first free end, said perimeter arm extension acting in concert with a pin chamber inner wall to form a generally continuous pin chamber perimeter.

2. An automotive door panel fastener assembly as described in claim 1, wherein said first flexible arm is angled inwardly towards said pin chamber.

3. An automotive door panel fastener assembly as described in claim 1, further comprising:
a second flexible arm having a second fixed end molded to said second slot side and a second free end extending towards said first slot side, said first flexible arm and said second flexible arm angled inwardly towards said pin chamber.

4. An automotive door panel fastener assembly as described in claim 1, where said doghouse end wall comprises an arched wall formed as an extension of said first doghouse sidewall and said second doghouse sidewall.

5. An automotive door panel fastener assembly as described in claim 1, wherein said perimeter arm extension is flexible and designed to slide along said pin chamber inner wall when said first flexible arm is flexed.

6. An automotive door panel fastener assembly as described in claim 1, further comprising:
a pin element assembly comprising:
a footing portion; and
a pin extension affixed to said footing portion;
wherein said pin element assembly is inserted into said doghouse insertion opening such that a pin lower portion flexes said first flexible arm as said pin element is moved through said entrance slot and into said pin chamber, said first flexible arm moving to lock said pin lower portion into said pin chamber once said pin element passes said first flexible arm.

7. An automotive door panel fastener assembly as described in claim 6, wherein said footing portion comprises:
a lower grommet footing;
an upper grommet footing, said pin extension extending from said lower grommet footing upwards through said upper grommet footing, said pin element inserted into said doghouse insertion opening such that said lower grommet footing moves under said doghouse ceiling, said upper grommet footing moves over said doghouse ceiling, and a pin lower portion moves through said entrance slot.

8. An automotive door panel fastener assembly as described in claim 7, further comprising:
at least one fin element formed on said doghouse floor, said fin element pressing said lower grommet footing into contact with said doghouse ceiling.

9. An automotive door panel fastener assembly as described in claim 8, wherein said at least one fin element is centered relative to said entrance slot.

10. An automotive door panel fastener assembly as described in claim 6, further comprising:
a locking tabular head formed on an upper pin surface of said pin extension.

11. An automotive door panel fastener assembly comprising:
a substrate;
a doghouse structure molded onto said substrate, said doghouse structure comprising:
a doghouse floor formed by said substrate;
a doghouse ceiling positioned above and separated from said doghouse floor;
a first doghouse sidewall joining said doghouse ceiling to said doghouse floor, said first doghouse sidewall having a first forward end and a first rearward end;
a second doghouse sidewall joining said doghouse ceiling to said doghouse floor, said second doghouse sidewall having a second forward end and a second rearward end;
and
a doghouse insertion opening bounded by said doghouse ceiling, said doghouse floor, said first doghouse sidewall and said second doghouse sidewall;
a pin chamber formed through said doghouse ceiling;
an entrance slot formed in said doghouse ceiling, said entrance slot providing a path from said doghouse insertion opening to said pin chamber, said entrance slot having a first slot side and a second slot side;
a first flexible arm having a first fixed end molded to said first slot side and a first free end extending towards said second slot side, said first flexible arm flexible in response to an inward force towards said pin chamber, said first flexible arm rigid in response to an outward force away from said pin chamber, said fist flexible arm angled inwardly towards said pin chamber;
a pin element assembly comprising:
a footing portion; and
a pin extension affixed to said footing portion;
wherein said pin element assembly is inserted into said doghouse insertion opening such that a pin lower portion flexes said first flexible arm as said pin element is moved through said entrance slot and into said pin chamber, said first flexible arm moving to lock said pin lower portion into said pin chamber once said pin element passes said first flexible; and
wherein said first free end remains in movable contact with said second slot side when in a natural state.

12. An automotive door panel fastener assembly as described in claim 11, further comprising:
a second flexible arm having a second fixed end molded to said second slot side and a second free end extending towards said first slot side, said first flexible arm and said second flexible arm angled inwardly towards said pin chamber.

13. An automotive door panel fastener assembly as described in claim 11, further comprising:
a perimeter arm extension formed on said first free end, said perimeter arm extension acting in concert with a pin chamber inner wall to form a generally continuous pin chamber perimeter.

14. An automotive door panel fastener assembly as described in claim 13, wherein said perimeter arm extension is flexible and designed to slide along said pin chamber inner wall when said first flexible arm is flexed.

15. An automotive door panel fastener assembly as described in claim 14, wherein said footing portion comprises:
a lower grommet footing;
an upper grommet footing, said pin extension extending from said lower grommet footing upwards through said upper grommet footing, said pin element inserted into said doghouse insertion opening such that said lower grommet footing moves under said doghouse ceiling, said upper grommet footing moves over said doghouse ceiling, and a pin lower portion moves through said entrance slot.

16. An automotive door panel fastener assembly as described in claim 15, further comprising:
   at least one fin element formed on said doghouse floor, said fin element pressing said lower grommet footing into contact with said doghouse ceiling.

17. An automotive door panel assembly comprising:
   a inner door substrate;
   a stamped door panel including a plurality of mounting ports;
   a plurality of doghouse structures molded onto said inner door substrate, each of said doghouse structures comprising:
      a doghouse floor formed by said substrate;
      a doghouse ceiling positioned above and separated from said doghouse floor;
      a first doghouse sidewall joining said doghouse ceiling to said doghouse floor, said first doghouse sidewall having a first forward end and a first rearward end; and
      a second doghouse sidewall joining said doghouse ceiling to said doghouse floor, said second doghouse sidewall having a second forward end and a second rearward end;
      a doghouse insertion opening bounded by said doghouse ceiling, said doghouse floor, said first doghouse sidewall and said second doghouse sidewall;
      a pin chamber formed through said doghouse ceiling;
      an entrance slot formed in said doghouse ceiling, said entrance slot providing a path from said doghouse insertion opening to said pin chamber, said entrance slot having a first slot side and a second slot side;
      a first flexible arm having a first fixed end molded to said first slot side and a first free end extending towards said second slot side, said first flexible arm flexible in response to an inward force towards said pin chamber, said first flexible arm rigid in response to an outward force away from said pin chamber, said fist flexible arm angled inwardly towards said pin chamber;
   a plurality of pin element assemblies each comprising:
   a footing portion; and
   a pin extension affixed to said footing portion, said pin extension including a locking tabular head formed on an upper pin surface;
   wherein each of said pin elements is inserted into one of said doghouse insertion openings such that a lower pin portion flexes said first flexible arm as said pin element is moved through said entrance slot and into said pin chamber, said first flexible arm moving to lock said lower pin portion into said pin chamber once said pin element passes said first flexible arm, said pin extension inserted into one of said mounting ports such that said inner door substrate becomes affixed to said stamped door panel;
   wherein each of said first flexible arms comprises:
   a perimeter arm extension formed on said first free end, said perimeter arm extension acting in concert with a pin chamber inner wall to form a generally continuous pin chamber perimeter.

* * * * *